(12) United States Patent
Kubo et al.

(10) Patent No.: US 6,721,248 B2
(45) Date of Patent: Apr. 13, 2004

(54) OPTICAL DISK UNIT

(75) Inventors: Mitsumasa Kubo, Tachikawa (JP);
Tadao Yamanouchi, Saitama-Ken (JP);
Yuichi Sakamoto, Musashino (JP);
Yoshiyuki Ootsuka, Akishima (JP)

(73) Assignee: Teac Corporation, Tokyo (JP)

( * ) Notice: Subject to any disclaimer, the term of this patent is extended or adjusted under 35 U.S.C. 154(b) by 253 days.

(21) Appl. No.: 09/867,724

(22) Filed: May 29, 2001

(65) Prior Publication Data

US 2002/0003758 A1 Jan. 10, 2002

(30) Foreign Application Priority Data

Jul. 4, 2000 (JP) .......................................... 2000-202253

(51) Int. Cl.<sup>7</sup> ................................................ G11B 7/00
(52) U.S. Cl. ................................. 369/44.41; 369/44.37; 369/44.27; 369/53.1
(58) Field of Search ....................... 369/44.41, 44.42, 369/44.37, 44.32, 44.28, 44.27, 53.1, 53.11, 53.12, 53.14, 53.15, 53.18, 53.19, 53.22

(56) References Cited

U.S. PATENT DOCUMENTS 5,719,840 A * 2/1998 Jann ....................... 369/53.15

FOREIGN PATENT DOCUMENTS

| JP | 63-193335 | 8/1888 |
| JP | 58-189840 | 11/1983 |
| JP | 61-214143 | 9/1986 |
| JP | 2-149941 A | 6/1990 |
| JP | 4-345920 A | 12/1992 |

* cited by examiner

*Primary Examiner*—Muhammad Edun
(74) *Attorney, Agent, or Firm*—Anderson, Kill & Olick, P.C.; Eugene Lieberstein; Michael N. Meller

(57) ABSTRACT

An optical disk unit for recording information on and reproducing information from a disk recording medium by projecting a light beam thereonto includes a signal level detection part detecting a level of a track error signal generated based on reflected light of the light beam from the disk recording medium, a scattered light detection part detecting scattering of the reflected light, and an off-track detection part which detects an off-track of the light beam using detection signals supplied from the signal level detection part and scattered light detection part.

7 Claims, 9 Drawing Sheets

OPTICAL DISK UNIT

BACKGROUND OF THE INVENTION

1. Field of the Invention

The present invention generally relates to optical disk units, and more particularly to an optical disk unit for recording information on an optical disk by using a light beam.

2. Description of the Related Art

Conventionally, an optical disk unit for a compact disk (CD), a compact disk recordable (CD-R), or a compact disk rewritable (CD-RW) has employed the 3 beam method as a tracking control method.

According to the 3 beam method, a light beam formed of a main beam and two subbeams is projected onto an optical disk, and by receiving reflected light from the optical disk, tracking control is performed at a time of information recording and reproduction.

FIG. 1 is a diagram for illustrating the 3 beam method.

A main beam MB is focused into a spot on a track 101 of an optical disk 100 and is used for information recording and reproduction, and focus control. A subbeam SB1 is focused into a spot that is in a forward direction, or in a direction indicated by arrow C1, from the spot of the main beam MB. The spot of the subbeam SB1 is displaced from the track 101 in the direction of the periphery of the optical disk 100, or in a direction indicated by arrow D1, with respect to the spot of the main beam MB. A subbeam SB2 is focused into a spot that is in a backward direction, or in a direction indicated by arrow C2, from the spot of the main beam MB. The spot of the subbeam SB2 is displaced from the track 101 in the direction of the center of the optical disk 100, or in a direction indicated by arrow D2, with respect to the spot of the main beam MB.

Reflected light of the main beam MB from the optical disk 100 is detected by a 4-part photodetector, and focus control is performed based on a shape of the reflected light. Further, a reproduced signal is detected based on the intensity of the reflected light. Reflected lights of the subbeams SB1 and SB2 from the optical disk 100 are detected, and tracking control is performed based on a difference between the reflected lights.

However, a beam is scattered by flaws and dust on the surface of an optical disk. The light amount of the beam changes as the beam is scattered. Particularly, if a main beam, which has a large amount of light, is scattered to be detected as a subbeam, a subbeam detection signal is greatly influenced so that a subbeam is prevented from being detected with accuracy.

Japanese Patent No. 2578791 and Japanese Laid-Open Patent Application No. 4-345920 disclose measures to reduce the influence of scattered light.

Japanese Patent No. 2578791 discloses a photodetector having a scattered light detector for detecting scattered light provided around a main detector and subdetectors. In this photodetector, the output signal of the scattered light detector is added to that of the main detector so that the output of the main detector is stabilized.

Japanese Laid-Open Patent Application No. 4-345920 discloses an optical disk unit that prevents tracking from entering in an uncontrollable state by suspending tracking control when scattered light is detected.

On the other hand, in a recording apparatus for a DRAW (Direct Read After Write) optical disk such as a CD-R or CD-RW, pits are formed in a disk at a time of data recording with an output level of a laser higher than that for data reproduction. Therefore, if a laser beam is focused off a track, that is, the off-track of the laser beam is caused, by vibrations caused by an impact during data recording, the laser beam may be projected onto a recorded area to destroy recorded data. Thus, such a recording apparatus includes a mechanism for suspending a recording operation in the case of an off-track during recording. Such a recording apparatus monitors a track error signal, and determines the occurrence of the off-track to suspend a recording operation when the track error signal reaches a predetermined level or higher during tracking.

As described above, a conventional optical disk unit monitors a track error signal based on the off-track of a laser beam, and determines the occurrence of the off-track to suspend a recording operation when the track error signal reaches a predetermined level or higher during tracking. Therefore, if a main beam is scattered by flaws on a disk to be detected by a subbeam detector so that the level of the track error signal becomes higher, a recording operation may be suspended based on a determination that the off-track has been caused. That is, although the off-track of the laser beam is not caused, the determination that the off-track has been caused is made to suspend the recording operation, thus causing an unstable recording operation.

SUMMARY OF THE INVENTION

It is a general object of the present invention to provide an optical disk unit in which the above-described disadvantage is eliminated.

A more specific object of the present invention is to provide an optical disk unit in which both stabilization of a recording operation and protection of recorded data are achieved.

The above objects of the present invention are achieved by an optical disk unit for recording information on and reproducing information from a disk recording medium by projecting a light beam thereonto, which optical disk unit includes a signal level detection part detecting a level of a track error signal generated based on reflected light of the light beam from the disk recording medium, a scattered light detection part detecting scattering of the reflected light, and an off-track detection part which detects an off-track of the light beam using detection signals supplied from the signal level detection part and scattered light detection part.

According to the above-described optical disk unit, the detection signals from both signal level detection part and scattered light detection part are employed in detecting the off-track of the light beam so that an information recording operation is prevented from being suspended by mistakenly detecting a flaw on the surface of the optical disk as an off-track. Therefore, both stabilization of a recording operation and protection of recorded data are achieved.

Additionally, the off-track detection part may detect the off-track of the light beam based on the detection signal supplied from the signal level detection part when the scattered light detection part detects no scattering of the reflected light and may be prevented from detecting the off-track of the light beam when said scattered light detection part detects the scattering of the reflected light.

Thereby, the optical disk unit is prevented from detecting the off-track of the light beam when the scattering of the reflected light is detected, that is, when the disk recording medium has a flaw on its surface. Therefore, an information recording operation is prevented from being suspended by mistakenly detecting the flaw on the surface of the optical disk as an off-track. This prevents the recording operation from being suspended by the flaw of the disk recording medium, thus achieving both stabilization of a recording operation and protection of recorded data in the optical disk unit.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be give, with reference to the accompanying drawings, of an embodiment of the present invention.

Figure 1:
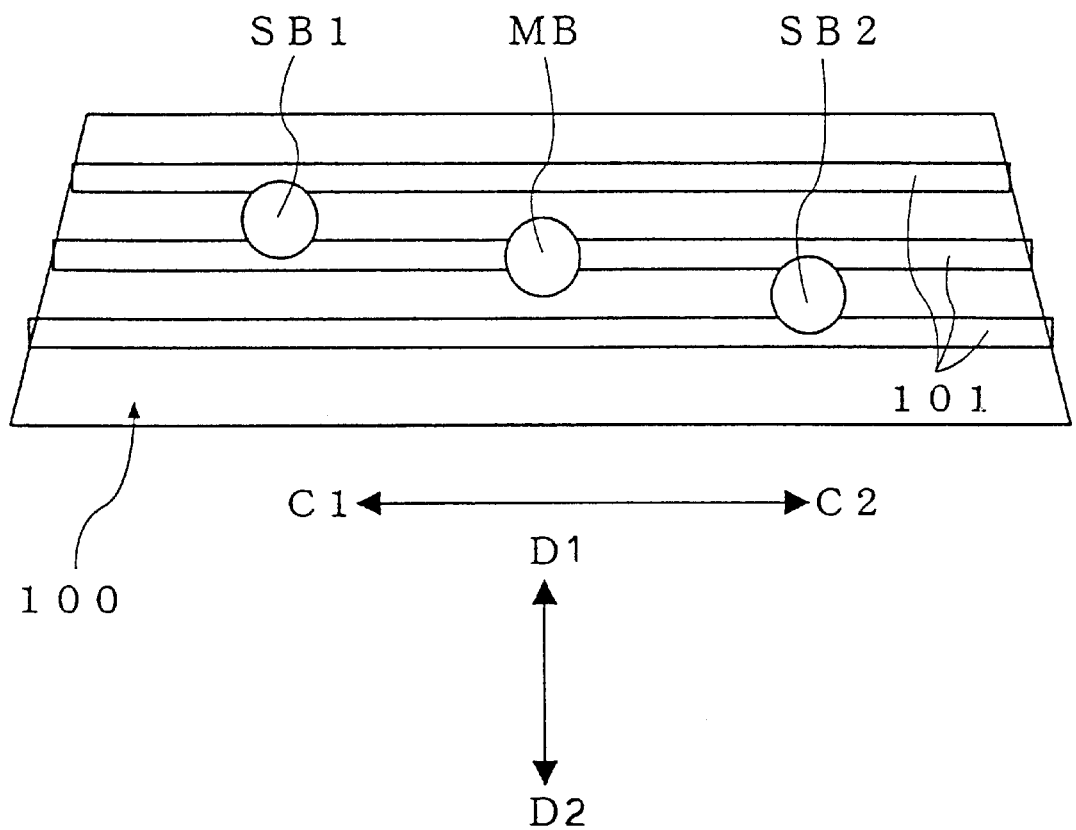
FIG. 1 is a diagram for illustrating the 3 beam method.
Figure 2:
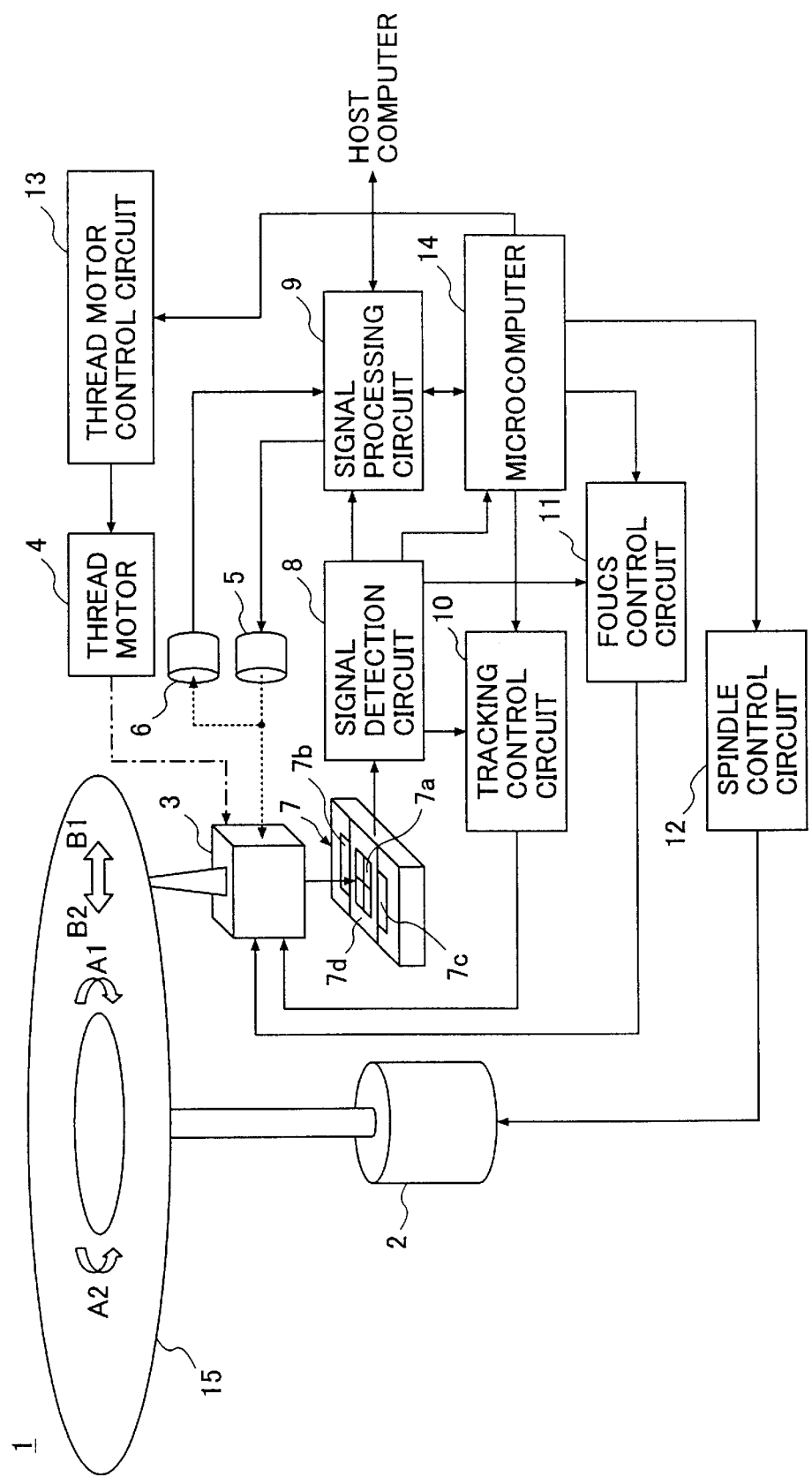
FIG. 2 is a block diagram of an optical disk unit according to an embodiment of the present invention.

FIG. 2 is a block diagram of an optical disk unit 1 according to the embodiment of the present invention.

The optical disk unit 1 includes a spindle motor 2, an optical pickup 3, a thread motor 4, a laser diode 5, a photodetector 6, a light receiving element (photodetector) 7, a signal detection circuit 8, a signal processing circuit 9, a tracking control circuit 10, a focus control circuit 11, a spindle control circuit 12, a thread motor control circuit 13, and a microcomputer 14.

An optical disk 15 is loaded into the optical disk unit 1 to engage the spindle motor 2. The spindle motor 2 is driven based on a driving signal supplied from the spindle control circuit 12 to rotate the optical disk 15 in a direction indicated by arrow A1.

The optical pickup 3 generates three beams of a main beam MB and subbeams SB1 and SB2 from a laser beam emitted from the laser diode 5, and projects the three beams onto the optical disk 15. The subbeam SB1 is focused into a spot that is in a forward tracking direction, or in a direction indicated by arrow A2, from the spot of the main beam MB. The spot of the subbeam SB1 is displaced from a tack on which the main beam MB is focused in the direction of the periphery of the optical disk 15, or in a direction indicated by arrow B1, with respect to the spot of the main beam MB. A subbeam SB2 is focused into a spot that is in a backward tracking direction, or in the direction indicated by the arrow A1, from the spot of the main beam MB. The spot of the subbeam SB2 is displaced from the track in the direction of the center of the optical disk 15, or in a direction indicated by arrow B2, with respect to the spot of the main beam MB. The optical pickup 3 is movable in the radial direction of the optical disk 15, or in a direction indicated by the arrows B1 and B2, by the thread motor 4. The thread motor 4 is driven based on a driving signal supplied from the thread motor control circuit 13.

The laser diode 5 is driven based on a recording signal supplied from the signal processing circuit 9 to emit the laser beam. The photodetector (front monitor) 6 detects the intensity of the laser beam emitted from the laser diode 5. The detection results in the photodetector 6 are supplied to the signal processing circuit 9. The signal processing circuit 9 controls the recording signal supplied to the laser diode 5 based on the detection results supplied from the photodetector 6 so as to maintain the intensity of the laser beam emitted from the laser diode 5 to a constant level. Further, the signal processing circuit 9 demodulates the reproduced signal and modulates the recording signal. The light receiving element 7 receives reflected light from the optical disk 15 and converts the reflected light into an electrical signal.

Figure 3:
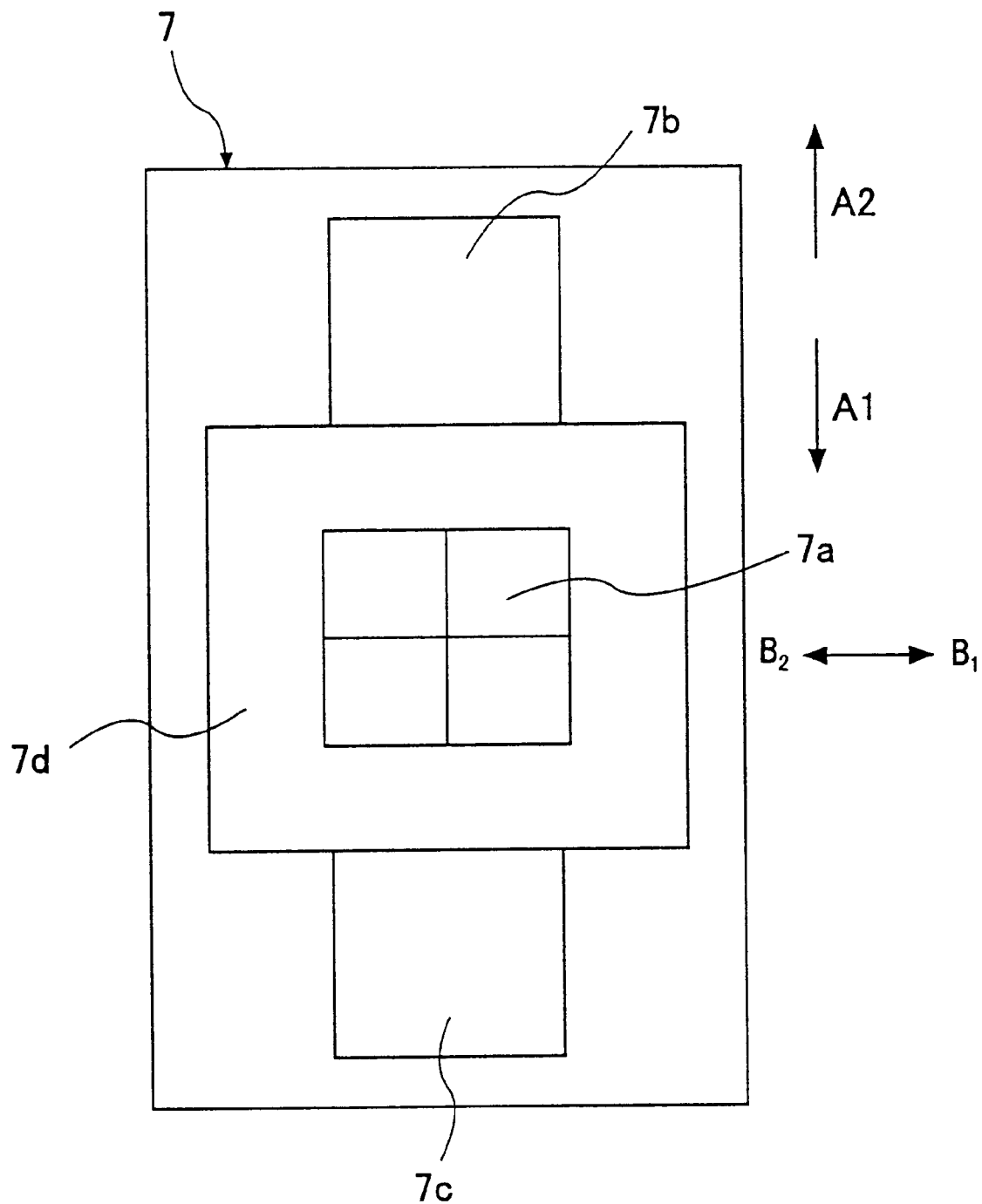
FIG. 3 is a diagram showing a structure of a light receiving element of the embodiment of the present invention.

FIG. 3 is a diagram showing a structure of the light receiving element 7 of the embodiment of the present invention.

The light receiving element 7 includes first through fourth light receiving parts 7a through 7d. The first light receiving part 7a is formed in the center part of the light receiving element 7 to detect the main beam MB. The first light receiving part 7a is split into four parts. The second light receiving part 7b is formed in the forward tracking direction, or in the A2 direction, from the first light receiving part 7a on the light receiving element 7, and detects the subbeam SB1. The third light receiving part 7c is formed in the backward tracking direction, or in the A1 direction, from the first light receiving part 7a on the light receiving element 7, and detects the subbeam SB2. The fourth light receiving part 7d is formed around the first light receiving part 7a to detect scattered light in the optical disk 15.

A detection signal detected in the light receiving element 7 is supplied to the signal detection circuit 8. The signal detection circuit 8 generates the reproduced signal, a focus error signal, a track error signal, and an off-track signal from the detection signal detected in the light receiving element 7.

Figure 4:
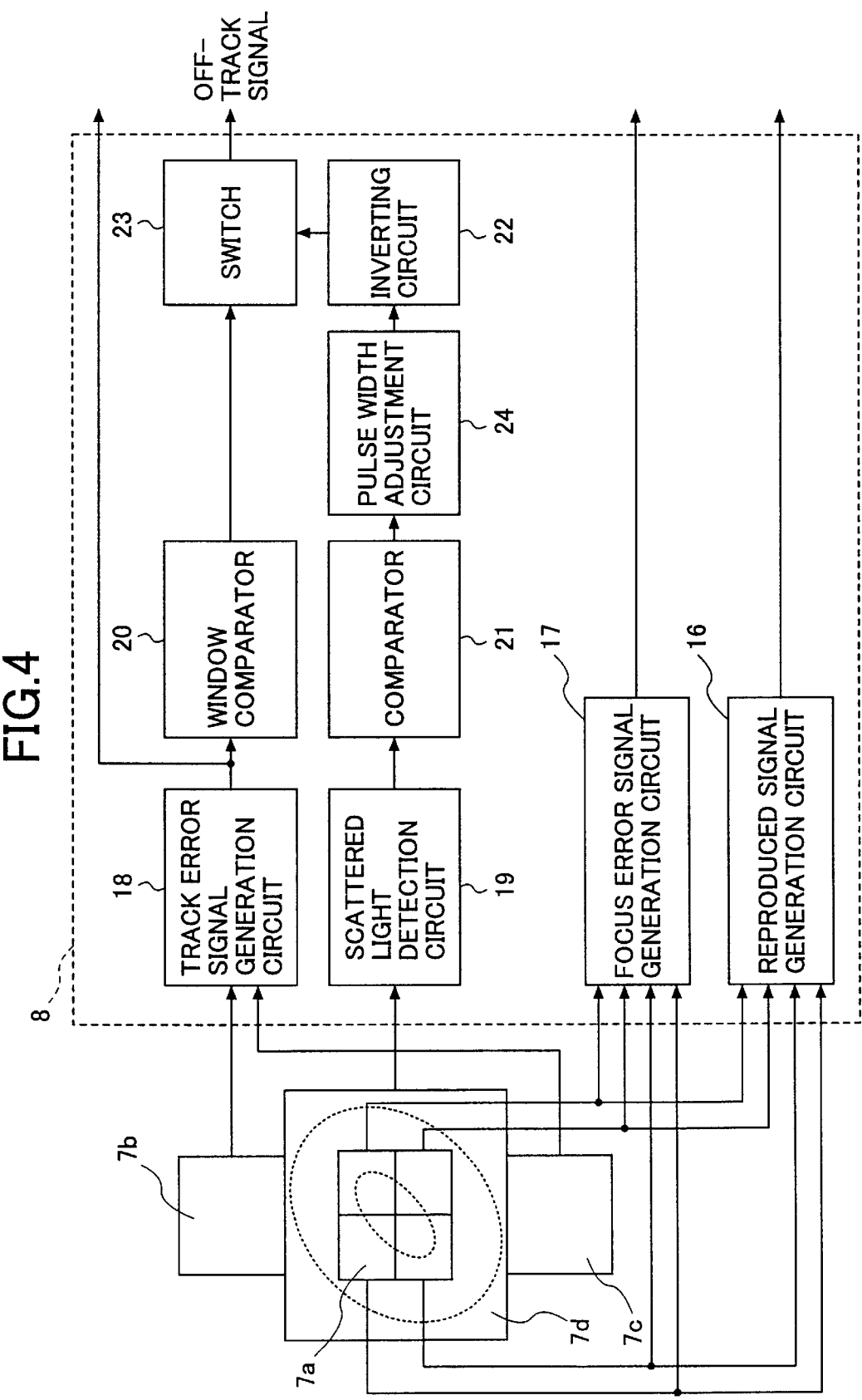
FIG. 4 is a block diagram of a signal detection circuit of the embodiment of the present invention.

FIG. 4 is a block diagram of the signal detection circuit 8 of the embodiment of the present invention.

The signal detection circuit 8 includes a reproduced signal generation circuit 16, a focus error signal generation circuit 17, a track error signal generation circuit 18, a scattered light detection circuit 19, a window comparator 20, a comparator 21, an inverting circuit 22, a switch 23, and a pulse width adjustment circuit 24.

The reproduced signal generation circuit 16 is connected to the first light receiving part 7a to generate the reproduced signal. The reproduced signal generated in the reproduced signal generation circuit 16 is supplied to the signal processing circuit 9.

The focus error signal generation circuit 17 is connected to the first light receiving circuit 7a to generate the focus error signal. The focus error signal generated in the focus error signal generation circuit 17 is supplied to the focus control circuit 11.

The track error signal generation circuit 18 is connected to the second and third light receiving parts 7b and 7c to generate the track error signal. The track error signal generated in the track error signal generation circuit 18 is supplied to the tracking control circuit 10 and the window comparator 20. The scattered light detection circuit 19 is connected to the fourth light receiving part 7d to detect scattered light. Flaws on the surface of the optical disk 15 are detected by means of the scattered light detection circuit 19. The scattered light detection signal of the scattered light detection circuit 19 is supplied to the comparator 21.

Here, a description will be given of the principle of a method of detecting a flaw on the surface of the optical disk 15 by way of scattered light.

Figure 5A:
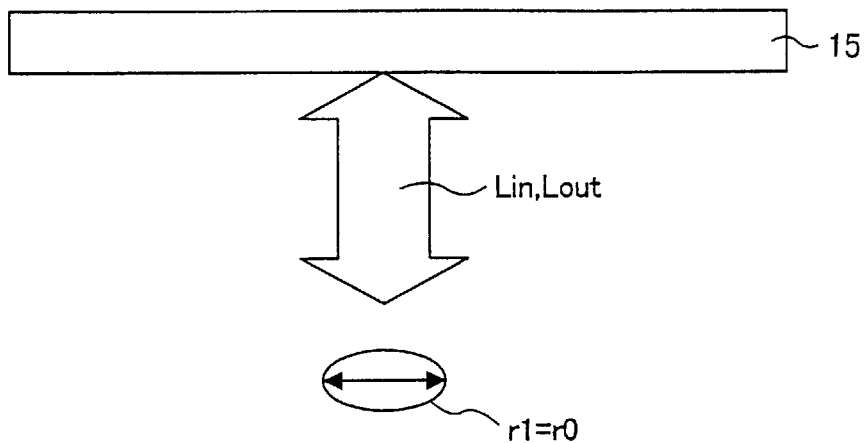
FIGS. 5A through 6B are diagrams for illustrating a scattered light detecting operation of the embodiment of the present invention.
Figure 5B:
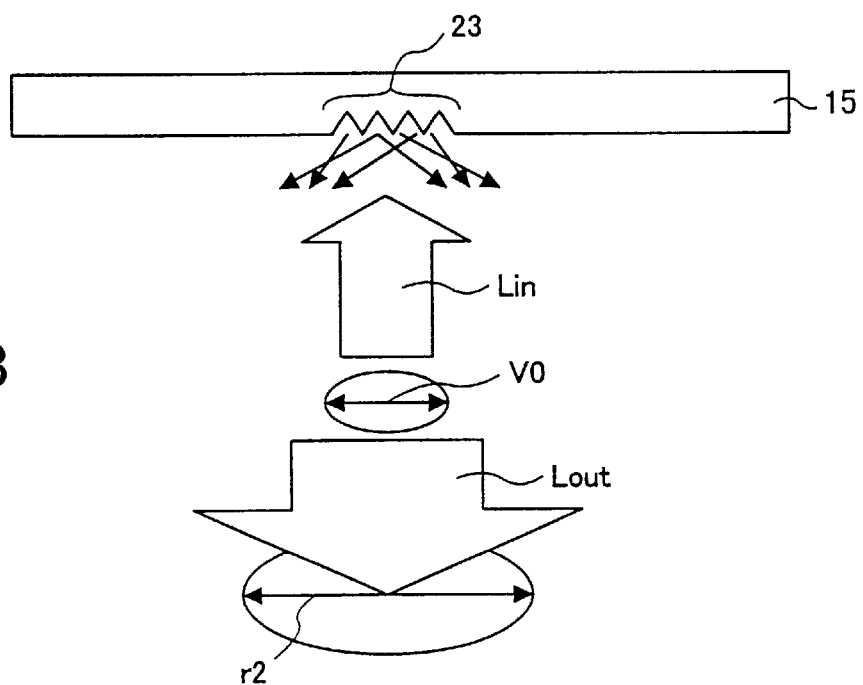
Figure 6A:
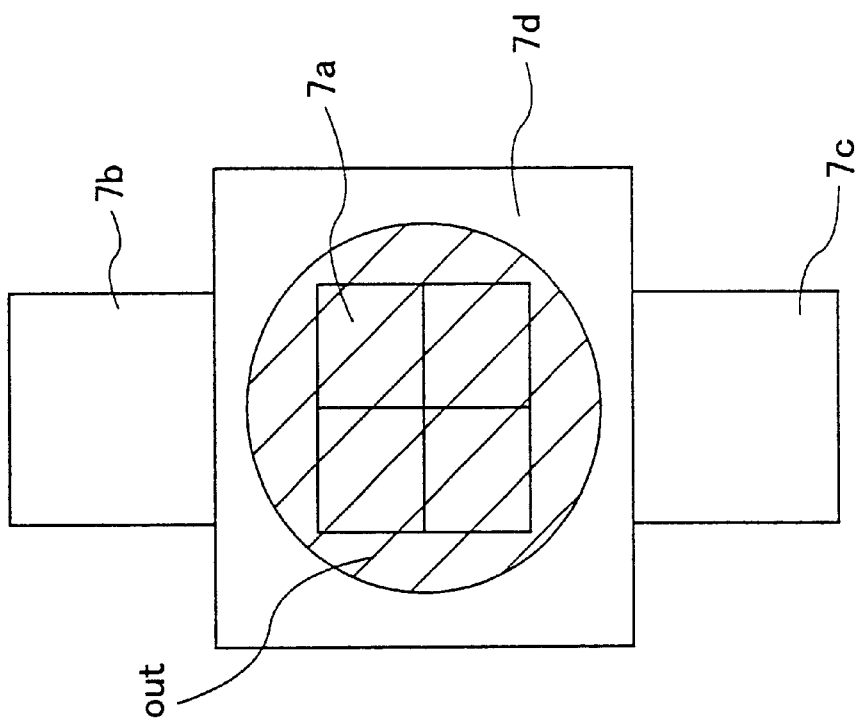
Figure 6B:
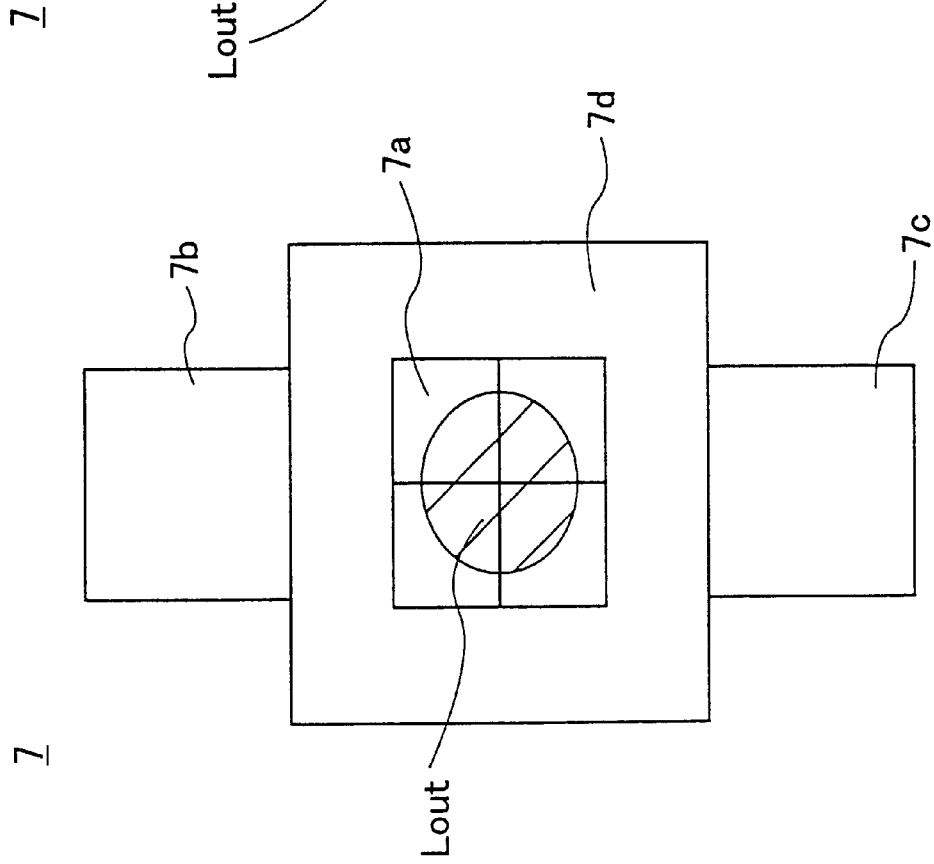

FIGS. 5A through 6B are diagrams for illustrating a scattered light detecting operation of the embodiment of the present invention. FIGS. 5A and 6A show a state of reflected light from the optical disk 15 with no flaw on its surface, and FIGS. 5B and 6B show a state of reflected light from the optical disk 15 with a flaw 23 on its surface.

In the case of the optical disk 15 with no flaw on its surface, a laser beam L is reflected from the surface of the optical disk 15 without being scattered. Therefore, as shown in FIG. 5A, a reflected light Lout has a beam diameter r1 substantially equal to a beam diameter r0 of an incident light Lin. At this point, as shown in FIG. 6A, the reflected light Lout is focused mainly onto the first light receiving part 7a of the light receiving element 7.

In the case of the optical disk 15 with the flaw 23 on its surface, the laser beam L is scattered on the flaw 23 of the surface of the optical disk 15 as shown in FIG. 5B, so that the reflected light Lout has a beam diameter r2 larger than the beam diameter r0 of the incident light Lin. The reflected light Lout having the larger beam diameter r2 is also projected onto the fourth light receiving part 7d formed around the first light receiving part 7a as shown in FIG. 6B.

Therefore, by detecting the light beam projected onto the fourth light receiving part 7d, the flaw 23 on the surface of the optical disk 15 can be detected.

Here, the description of the signal detection circuit 8 is resumed with reference to FIG. 4.

The window comparator 20 sets its output level to LOW when the track error signal has a level higher than a first threshold level and lower than a second threshold level, and to HIGH when the track error signal has a level lower than a first threshold or higher than a second threshold level. The first and second threshold levels are set in a range that can be covered by tracking by the track error signal. The output of the window comparator 20 is supplied to the switch 23.

The comparator 21 compares the scattered light detection signal supplied from the scattered light detection circuit 19 with a reference voltage. The comparator sets its output level to LOW when the scattered light detection signal has a level lower than the reference voltage, and to HIGH when the scattered light detection signal has a level higher than the reference voltage. The output of the comparator 21 is supplied to the pulse width adjustment circuit 24 to be adjusted to have a sufficient pulse width to stabilize the track error signal. Thereafter, the output of the pulse width adjustment circuit 24 is supplied to the inverting circuit 22. The inverting circuit 22 inverts the output of the pulse width adjustment circuit 24 and supplies the inverted output to the switch 23.

The switch 23 is switched ON to output the output of the window comparator 20 as the off-track signal when the level of the output signal of the inverting circuit 22 is HIGH. The switch 23 is switched OFF to set the level of the off-track signal to LOW. The off-track signal is supplied to the microcomputer 14.

By the above-described structure, the signal detection circuit 8 generates the reproduced signal, the focus error signal, the track error signal, and the off-track signal from the detection signal supplied from the light receiving element 7. With respect to the signals generated in the above-described signal detection circuit 8, the reproduced signal is supplied to the signal processing circuit 9, the focus error signal is supplied to the focus control circuit 11, the track error signal is supplied to the tracking control circuit 10, and the off-track signal is supplied to the microcomputer 14.

According to FIG. 2, the signal processing circuit 9 decodes the reproduced signal supplied from the signal detection circuit 8 and outputs the decoded reproduced signal to an external apparatus, or a host computer. Further, the signal processing circuit 9 controls the output of the laser diode 5 based on the recording signal supplied from the host computer.

The microcomputer 14 controls the tracking control circuit 10, the focus control circuit 11, the spindle control circuit 12, and the thread motor control circuit 13 based on a variety of commands supplied from the host computer.

Next, a description will be given, with reference to FIG. 7, of an operation of the microcomputer 14 of the embodiment of the present invention.

Figure 7:
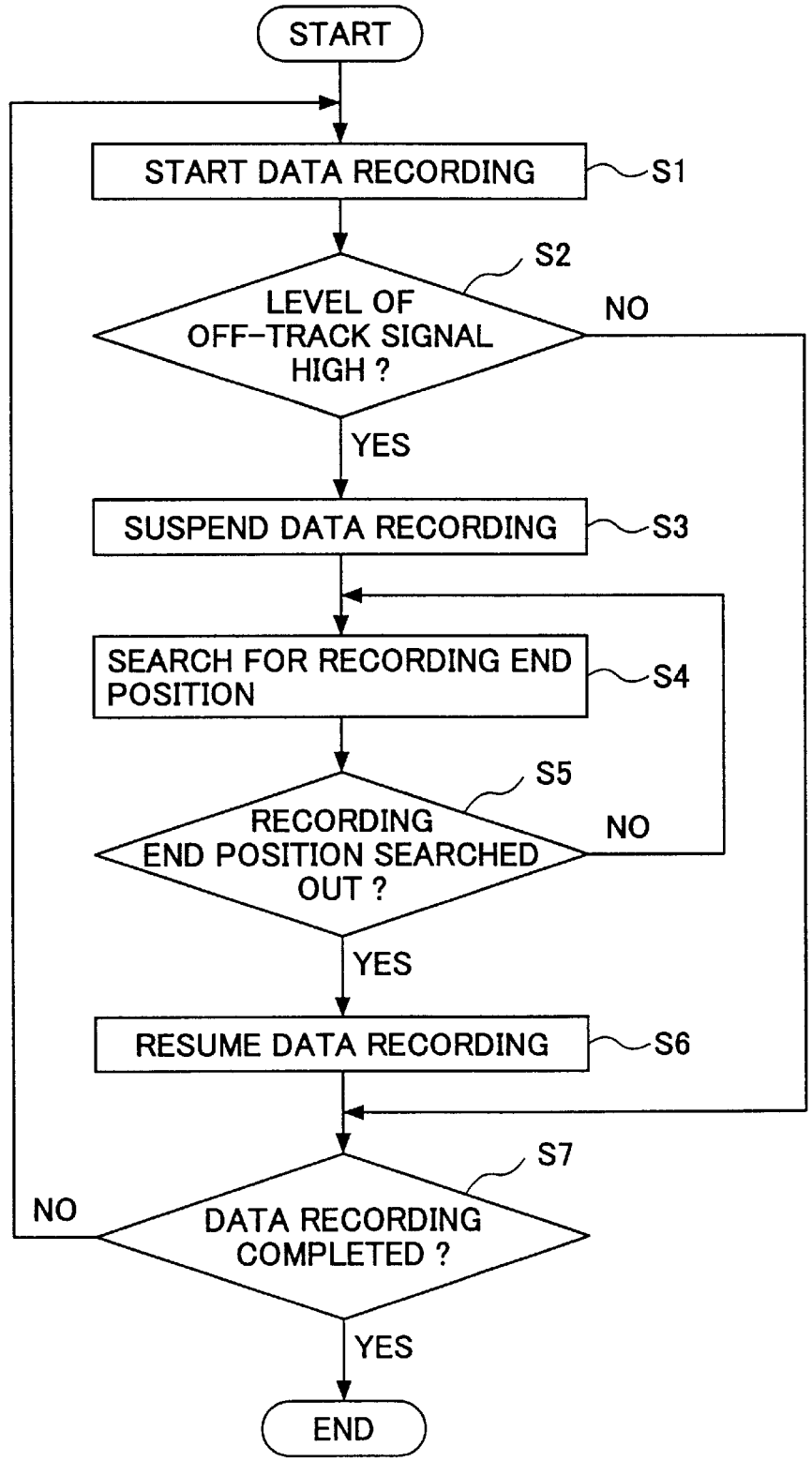
FIG. 7 is a flowchart of a recording operation of a microcomputer of the embodiment of the present invention.

FIG. 7 is a flowchart of a recording operation of the microcomputer 14.

In step S1, the microcomputer 14 starts data recording based on a command supplied from the host computer.

In step S2, it is determined whether the level of the off-track signal supplied from the signal detection circuit 8 is HIGH or LOW. If it is determined in step S2 that the level of the off-track signal is HIGH, step S3 is performed.

In step S3, the data recording is suspended. This prevents unintentional data recording on a wrong track and consequent data destruction, which may be caused by the off-track of the laser beam. After the data recording is suspended in step S3, step S4 is performed.

In step S4, a recording end position is searched for.

In step S5, it is determined whether the recording end position is searched out. If it is determined in step S5 that the recording end position is searched out, step S6 is performed.

In step S6, the data recording is resumed.

In step S7, it is determined whether the data recording is completed. If it is determined in step S7 that the data recording is completed, the recording operation ends. If it is determined in step S7 that the data recording is not completed, the recording operation returns to step S1 to continue the data recording.

During this recording operation of this embodiment, even if the output level of the window comparator 20 is HIGH, that is, even if the level of the track error signal is out of a range between the first and second threshold levels, the switch 23 is switched OFF to maintain the level of the off-track signal to LOW so that the data recording is not suspended if the output level of the inverting circuit 22 is LOW, that is, if the amount of the scattered light included in the reflected light from the optical disk 15 is large so that it is determined that the optical disk 15 contains the flaw 23 on its surface.

This prevents the interruption of the recording operation caused by mistakenly detecting the flaw 23 of the surface of the optical disk 15 as an off-track. Even if a minute flaw erases recorded information, the erased information can be recovered by error correction. In the case of a flaw on which error correction is not performable, re-allocation is performed to record data in a sector or a track other than a part having the flaw.

In this embodiment, the fourth light receiving part 7d for detecting the scattered light is provided around the first light receiving part 7a in the light receiving element 7. However, the fourth light receiving part 7d for detecting the scattered light is not limitedly provided in the above-described position, but may be provided around the second and third light receiving parts 7b and 7c or around the first through third light receiving parts 7a through 7c.

Figure 8A:
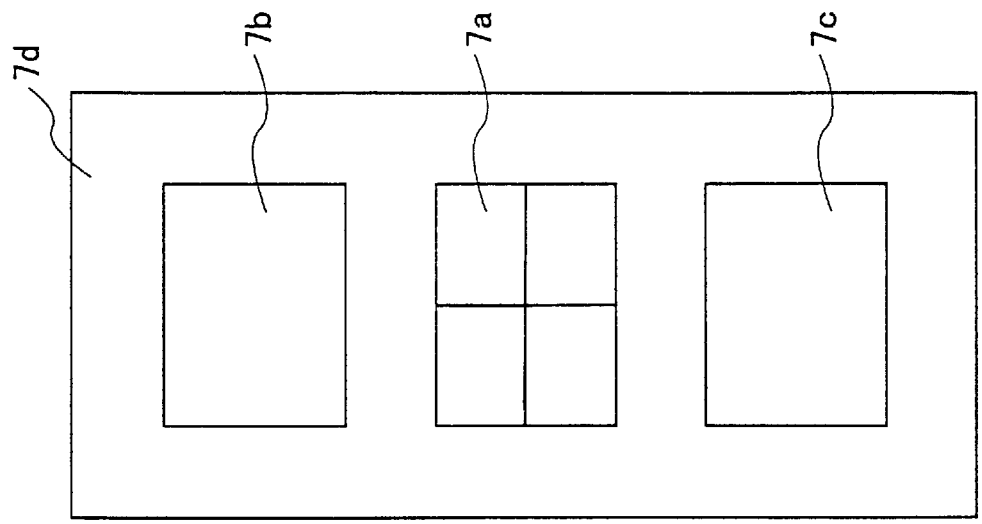
FIGS. 8A and 8B are diagrams showing variations of the light receiving element of FIG. 3.
Figure 8B:
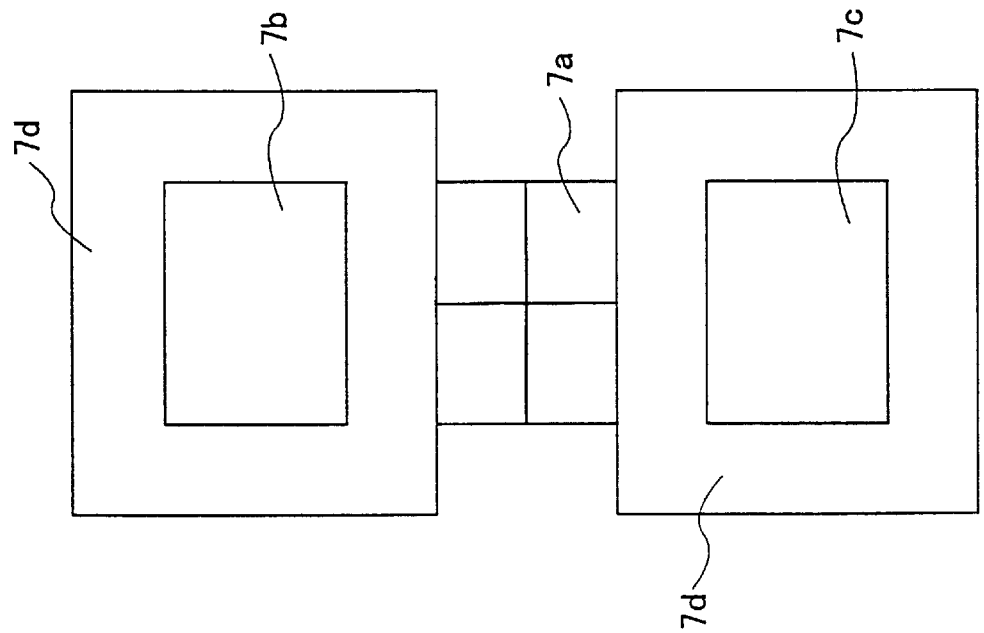

FIGS. 8A and 8B are diagrams showing variations of the light receiving element 7 of the embodiment of the present invention. FIG. 8A shows a case where the fourth light receiving part 7d is provided around the second and third light receiving parts 7b and 7c, and FIG. 8B shows a case where the fourth light receiving part 7d is provided around the first through third light receiving parts 7a through 7c.

According to the arrangement of FIG. 8A, the output of the off-track signal can be controlled by detecting the scattering of the subbeams SB1 and SB2.

According to the arrangement of FIG. 8B, the output of the off-track signal can be controlled by detecting the scattering of the main beam MB and the subbeams SB1 and SB2.

In the above-described variations, the fourth light receiving part 7d is separately provided in addition to the first through third light receiving parts 7a through 7c to detect the scattered light. However, the scattered light may be detected by the second and third light receiving parts 7b and 7c.

Figure 9:
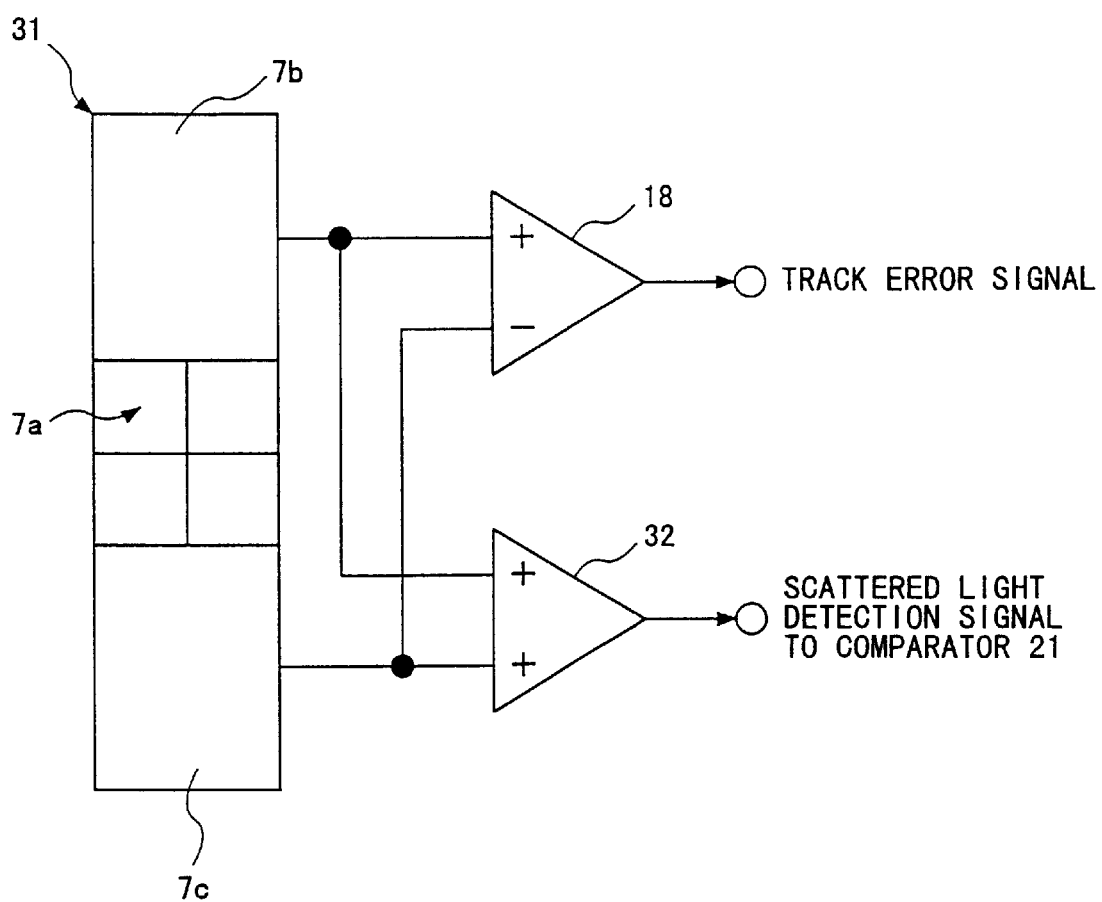
FIG. 9 is a diagram showing another variation of the light receiving element of FIG. 3.

FIG. 9 is a diagram showing another variation of the light receiving element 7 of the embodiment of the present invention. In the drawing, the same elements as those of FIGS. 3 and 4 are referred to by the same numerals, and a description thereof will be omitted.

A light receiving element 31 of this variation has the second and third light receiving parts 7b and 7c provided in close proximity to the first light receiving part 7a so that the scattered light of the main beam MB is made incident on the second and third light receiving parts 7b and 7c. An adder 32 generates an output corresponding to the sum of the detection signals supplied from the light receiving parts 7b and 7c, and the output of the adder 32 is employed as the scattered light detection signal.

In this case, since the detection signals from the light receiving parts 7b and 7c include the subbeams Sb1 and SB2, respectively, the threshold level, or the reference level, of the comparator 21 should be set to a level considering the subbeams SB1 and SB2.

The window comparator 20, the scattered light detection circuit 19 and the comparator 21, and the inverting circuit 22, the switch 23, and the pulse width adjustment circuit 24 correspond to a signal level detection part, a scattered light detection part, and an off-track detection part of the optical disk unit 1 of the present invention, respectively.

The present invention is not limited to the specifically disclosed embodiment, but variations and modifications may be made without departing from the scope of the present invention.

The present application is based on Japanese priority application No. 2000-202253 filed on Jul. 4, 2000, the entire contents of which are hereby incorporated by reference.

What is claimed is:

1. An optical disk unit for recording information on and reproducing information from a disk recording medium by projecting a light beam thereonto, the optical disk unit comprising:

a tracking error signal generation circuit responsive to reflected light from the disk recording medium for generating a track error signal;

a signal level detection part for supplying a detection signal in response to an output level of the track error signal;

a scattered light detection part for generating a scattered light detection signal in response to scattering of the reflected light; and an off-track detection part which detects an off-track of the light beam using the detection signal supplied from said signal level detection part and the scattered light detection signal supplied from said scattered light detection part.

2. The optical disk unit as claimed in claim 1, wherein said off-track detection part detects the off-track of the light beam based on the detection signal supplied from said signal level detection part when said scattered light detection part detects no scattering of the reflected light and is prevented from detecting the off-track of the light beam when said scattered light detection part detects the scattering of the reflected light.

3. The optical disk unit as claimed in claim 1, wherein:

the light beam includes a main beam and first and second subbeams each focused into a spot on the disk recording medium, the spots of the first and second subbeams being located in first and second tracking directions of the disk recording medium from the spot of the main beam, respectively, first and second tracking directions being reverse to each other; and said scattered light detection part detects light around the main beam as the scattered light.

4. The optical disk unit as claimed in claim 3, wherein said scattered light detection part comprises a main beam receiving part for detecting the main beam and a scattered light receiving part for detecting the scattered light, the scattered light receiving part being provided around the main beam receiving part, and detects the scattering based on a detection signal from the scattered light receiving part.

5. The optical disk unit as claimed in claim 4, wherein:

said scattered light detection part further comprises first and second subbeam receiving parts for detecting the first and second subbeams; and the scattered light receiving part is also provided around the first and second subbeam receiving parts.

6. The optical disk unit as claimed in claim 3, wherein said scattered light detection part comprises a main beam receiving part for detecting the main beam and first and second subbeam receiving parts for detecting the first and second subbeams, respectively, the first and second subbeam receiving parts being provided in close proximity to the main beam receiving part, and detects the scattering based on a sum of detection signals supplied from the first and second subbeam receiving parts.

7. The optical disk unit as claimed in claim 1, wherein information recording is suspended if the off-track of the light beam is detected during the information recording.

* * * * *